(No Model.)
C. HAMMELMANN.
SELF LUBRICATING PULLEY.
No. 330,234. Patented Nov. 10, 1885.
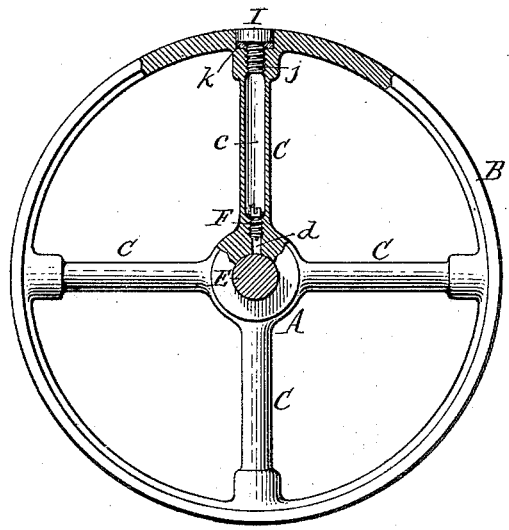
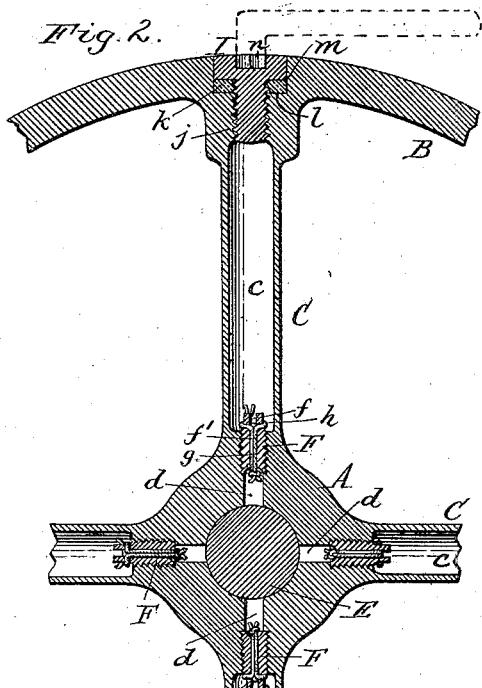
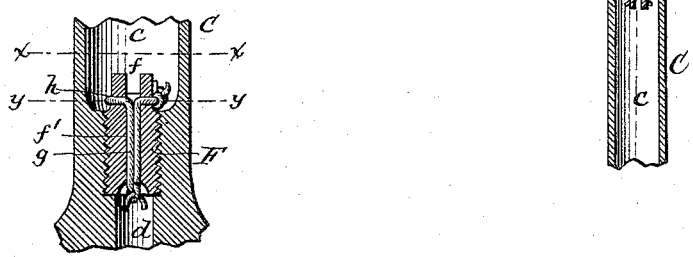
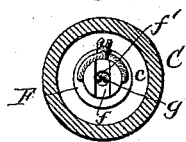
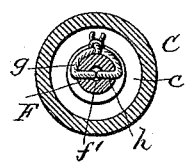
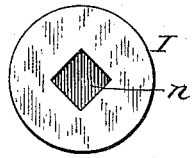
Witnesses:
Theodore L. Popp
Geo. J. Buchheit Jr.
C. Hammelmann Inventor.
By Wilhelm Bonner
Attorneys

UNITED STATES PATENT OFFICE.

CHARLES HAMMELMANN, OF BUFFALO, NEW YORK.

SELF-LUBRICATING PULLEY.

SPECIFICATION forming part of Letters Patent No. 330,234, dated November 10, 1885.

Application filed October 9, 1885. Serial No. 179,432. (No model.)

*To all whom it may concern:*

Be it known that I, CHARLES HAMMELMANN, of the city of Buffalo, in the county of Erie and State of New York, have invented new and useful Improvements in Self-Lubricating Pulleys, of which the following is a specification.

This invention relates to improvements in self-lubricating loose pulleys, and has for its object to construct a pulley of this kind which will be light, durable, and evenly balanced, and which will contain a sufficient quantity of oil to enable the pulley to be run for a considerable length of time.

The invention consists of the improvements in the construction of the pulley, as will be hereinafter fully set forth, and pointed out in the claims.

In the accompanying drawings, Figure 1 represents a sectional elevation of my improved pulley. Fig. 2 is a fragmentary longitudinal section thereof on an enlarged scale. Fig. 3 is a vertical section, on an enlarged scale, of the inner portion of one of the arms. Figs. 4 and 5 are cross-sections in lines $xx$ and $yy$, Fig. 3, respectively. Fig. 6 is a top plan view of the screw-cap.

Like letters of reference refer to like parts in the several figures.

A represents the hub, B the rim, and C the arms, of the pulley, which connect the rim with the hub, all of which are cast in one piece. The arms C are cast hollow throughout their entire length, and form oil chambers or reservoirs $c$.

$d$ are openings formed in the hub A, and forming continuations of the chambers $c$, and extending through the hub to the shaft E, upon which the pulley revolves. The openings $d$ are screw-threaded and provided with screw-plugs F, which are inserted through the outer open ends of the hollow arms and screwed into the openings $d$. The screw-plugs F are provided on their tops with slots $f$, in which a screw-driver can be inserted for turning the plugs F.

$f'$ is a central bore formed in each screw-plug F, and extending through the plug and forming a passage for the oil from the chambers $c$ into the openings $d$. The passage $f'$ is filled with wicking, cotton-waste, or other suitable loose absorbent material $g$, whereby the oil in the chambers $c$ is prevented from flowing too freely through the passage. The wicking $g$ is secured in the bore or passage $f'$ by first inserting it through a slot or opening, $h$, extending across the plug F at right angles to and intersecting the passage $f'$. The wicking is then drawn through the passage $f'$ and a knot formed at its lower end, which rests in a cavity formed in the lower end of the plug around the passage $f'$. The ends of the wicking extending from opposite sides of the opening $h$ are now brought together and tied or knotted on one side of the plug, as shown in Fig. 5. The wicking is in this manner firmly secured to the plug F, the slot $f$ is not obstructed by the wicking, and the oil is permitted to gradually escape from the oil-chambers through the passage $f'$. The chambers $c$ are closed by screw-caps I, which are screwed into threaded openings $j$, formed in the outer ends of the arms C, in line with the oil-chambers.

$k$ is a washer, of leather or other suitable material, which surrounds the opening $j$ and rests against a shoulder, $l$, which is formed by an enlargement or cavity, $m$, formed in the rim B. The head of each screw-cap I is made to fit snugly in the cavity $m$ when the cap is screwed home, and is flush with the outer face of the rim, and does not obstruct the movement of the belt over the pulley.

$n$ is a recess or socket formed in the head of the screw-cap I, in which a suitable wrench can be inserted for turning the screw-cap I.

When the openings $d$ have been closed by the plugs F, the chambers $c$ are filled with oil or other lubricant material, and the openings $j$ closed by means of the screw-caps I. The washer $k$, being clamped between the head of the screw-cap and the shoulder $l$, forms a perfectly tight joint and prevents any leakage of the oil at this point. The wicking $g$ closes the passages $f'$ in the plugs F sufficiently to prevent the oil escaping from the chambers $c$ when the pulley and shaft are both at rest. When motion is imparted to the shaft E, a partial vacuum or suction is formed in the openings $d$, which causes the lubricant to drip through the passages $f'$ and drop upon the shaft, and thereby keep the same properly oiled without requiring the attention of an attendant.

The arms C are of equal number, preferably four, and all of the chambers are filled with oil at the same time, whereby the pulley is kept equally balanced and supplied with sufficient oil to last a considerable length of time.

I claim as my invention—

1. In a self-lubricating pulley, the combination, with the hub A and rim B, of the hollow arms C, connecting the rim with the hub and forming oil-chambers $c$, openings $d$, formed in the hub and communicating with the oil-chambers $c$, threaded openings $j$, formed in the outer ends of the arms C, washers $k$, and screw-caps I, secured in the threaded openings $j$, and closing the oil-chambers, substantially as set forth.

2. In a self-lubricating pulley, the combination, with the hub A and rim B, of the hollow arms C, forming oil-chambers $c$, openings $d$, formed in the hub and communicating with the chambers $c$, screw-plugs F, secured in the openings $d$, and screw-caps I, secured in threaded openings formed in the outer ends of the hollow arms, and closing the chambers $c$, substantially as set forth.

3. In a self-lubricating pulley, the combination, with the hub A and rim B, of the hollow arms C, forming oil-chambers $c$, openings $d$, formed in the hub in line with the oil-chambers, and provided with screw-plugs F, passages $f'$, formed in said plugs, and provided with wicking $g$, and screw-caps I, secured in the outer ends of the hollow arms and closing the oil-chambers $c$, substantially as set forth.

Witness my hand this 26th day of September, 1885.

CHARLES HAMMELMANN.

Witnesses:
CARL F. GEYER,
OSCAR SCHAUB.